United States Patent [19]

Baillet

[11] Patent Number: 4,674,542

[45] Date of Patent: Jun. 23, 1987

[54] DOUBLE-WALL WELDED TUBE

[75] Inventor: Raymond Baillet, Gueugnon, France

[73] Assignee: Ugine Gueugnon S.A., Gueugnon, France

[21] Appl. No.: 712,710

[22] Filed: Mar. 18, 1985

[30] Foreign Application Priority Data

Mar. 16, 1984 [FR] France ................ 84 04134

[51] Int. Cl.⁴ ........................................ F16L 9/14
[52] U.S. Cl. .................................. 138/148; 138/151; 29/455 R
[58] Field of Search ............... 138/148, 149, 151, 152, 138/115–117; 29/455 R; 228/149, 173.6, 151, 152; 165/180, 183

[56] References Cited

U.S. PATENT DOCUMENTS

| 1,218,895 | 3/1917 | Porter | 138/148 |
|---|---|---|---|
| 2,076,643 | 4/1937 | Holt et al. | 138/152 |
| 2,203,006 | 6/1940 | Young | 138/151 |
| 2,274,519 | 10/1945 | Barrett . | |
| 3,058,861 | 10/1962 | Rutter | 138/149 |
| 3,201,861 | 8/1965 | Fromson et al. | 138/149 |
| 3,299,417 | 1/1967 | Sibthorpe | 138/148 |
| 3,327,383 | 6/1967 | Reed . | |
| 3,404,445 | 10/1968 | Crouse | 138/148 |
| 3,434,503 | 3/1969 | Knox . | |
| 3,880,194 | 4/1975 | McNeal | 138/148 |
| 4,175,882 | 11/1979 | Gilead | 138/148 |
| 4,404,992 | 9/1983 | Sasaki et al. | 138/149 |
| 4,428,420 | 1/1984 | Blakely | 138/152 |

FOREIGN PATENT DOCUMENTS 868704 12/1940 France .
1038035 8/1966 United Kingdom .

Primary Examiner—Stephen Marcus
Assistant Examiner—Leo J. Peters
Attorney, Agent, or Firm—Wenderoth, Lind & Ponack

[57] ABSTRACT

The double-wall welded tube has two portions of the tube, in the region of which the weld (10) is located, which are each defined by the outer surface of a fold (6, 7) formed by the material constituting, in this region, the double wall of the tube. In this way, the regin in which the weld is effected is perfectly homogeneous and the weld can therefore be of very high quality.

17 Claims, 12 Drawing Figures

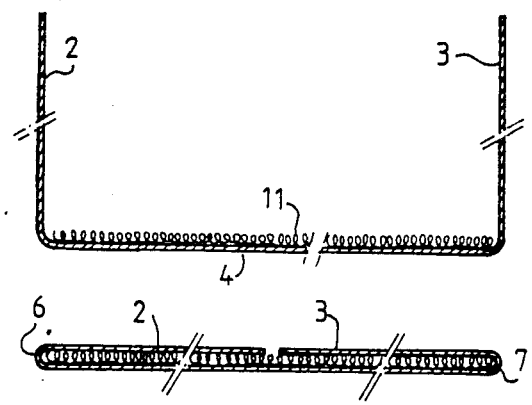
FIG.5
FIG.6
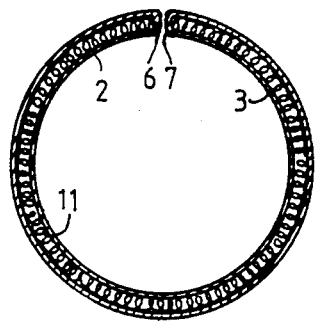
FIG.7
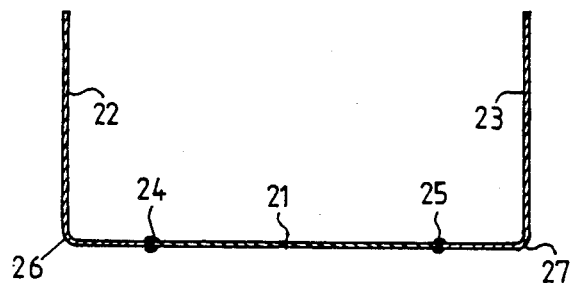
FIG.8
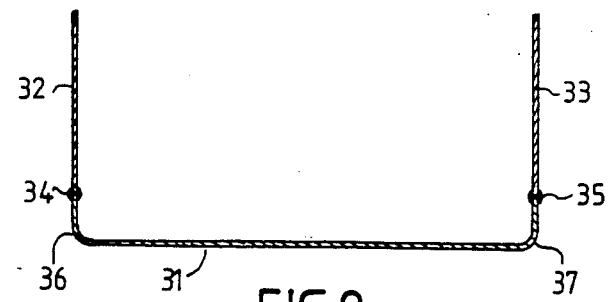
FIG.9

DOUBLE-WALL WELDED TUBE

FIELD OF THE INVENTION

The present invention relates to double-wall tubes and to their methods of production.

BACKGROUND OF THE INVENTION

It is known to be of interest in many applications, for example in motor vehicle constructions, to use double-wall tubes between the walls of which may optionally be disposed a filler material in continuous or discontinuous contact with the two walls between which it is disposed. The presence of these two walls and a gap therebetween, which is or is not filled, permits the obtainment of improved properties of insulation from the thermal point of view or the sound point of view. Such tubes may for example be employed for forming exhaust pipes of motor vehicles.

A method for producing such tubes may comprise forming a composite assembly obtained by superimposing two metal sheets maintained at a certain distance from each other by spacer means in one integral piece with one or the other of these two sheets or connected thereto, or separated by a continuous or discontinuous inserted material which may be formed by a metal lattice or netting or by a material in the form of a foam, powder or other material. This composite assembly is then rolled so as to form a tube and the two adjacent ends are assembled by welding. However, a serious drawback of this method resides in the fact that, in the zone of the weld, the two confronting edges of the composite material are formed by sharp edges of the two sheets constituting the inner and outer walls of the tube, so that the weld between these two confronting portions is liable to be of poor quality and the strength and the fluidtightness of the tube may consequently be seriously affected. This is due to inevitable defects in the geometry of the confronting edges and to a defect of homogeneity which is still further increased if a meltable material is located between the two sheets and is mixed with the molten bath during the welding operation.

SUMMARY OF THE INVENTION

An object of the invention is therefore to provide a tube and a production method whereby these drawbacks are avoided.

The invention therefore provides a double-wall welded tube wherein the two parts of the tube in the region of which the weld is located are each defined by the outer surface of a fold formed by the material which constitutes the double wall of the tube in this region.

The invention also provides a method for producing such a tube, comprising forming a double-wall blank whose two free opposed parallel edge portions are formed respectively by a fold of the material defining said walls, imparting to said blank the shape of a tube and assembling by welding the two free parallel adjacent edge portions.

According to other features of the invention:

the blank is obtained by folding a sheet in that two opposed lateral portions of said sheet are folded over at 180°;

the two folded-over lateral portions are formed by a material which is different from that of the central portion of the sheet;

the blank is formed from a tube which is flattened.

BRIEF DESCRIPTION OF THE DRAWINGS

The invention will be described in more detail hereinafter with reference to the accompanying drawings which are given solely by way of examples and in which:

FIGS. 5, 6 and 7 are views similar to FIGS. 1, 2 and 3 for producing a double-wall tube in which the walls are separated by an interposed netting or other means;

FIGS. 8 and 9 are two cross-sectional views of two modifications;

DETAILED DESCRIPTION OF THE PREFERRED EMBODIMENT

Figure 1:
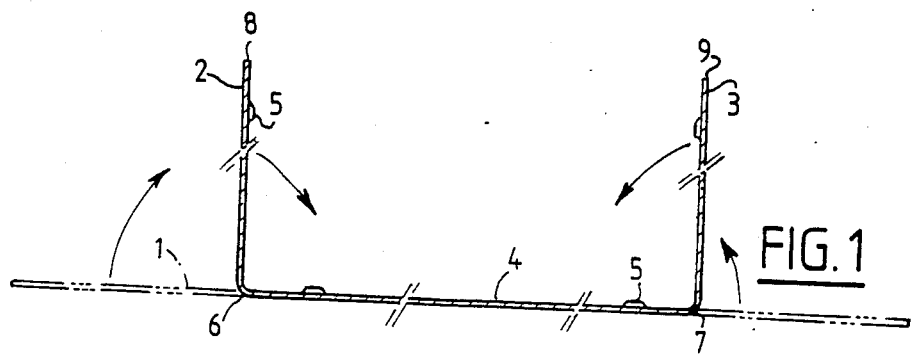
FIG. 1 is a sectional view of a sheet in an initial stage of the production of a tube according to the invention.
Figure 2:
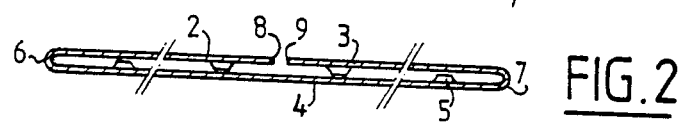
FIG. 2 is a sectional view of a blank in an intermediate stage of the production.

The drawing shows a metal sheet 1, for example of steel or any other suitable metal, the two lateral wall portions 2, 3 of which are formed-over from a position shown in dot-dash lines to a position shown in FIG. 2 in passing through the position shown in FIG. 1. The width of the wings 2, 3 is roughly equal to, or preferably slightly less than one half of the width of the central portion 4 of the sheet. The double-wall tube thus comprises an other wall 4 having an outer surface and an inner surface extending between opposite edges thereof, an inner wall 2, 3 having an outer surface and an inner surface extending between opposite edges thereof, the inner wall comprising at least one portion 2, 3 and the outer surface of the inner wall spaced from the inner surface of the outer wall with an insulating gap therebetween, a first transition wall 6 extending between one of the opposite edges of the outer wall and one of the opposite edges of the inner wall, the first transition wall having opposed surfaces with one of the opposed surfaces extending between the outer surface of the outer wall and the inner surface of the inner wall and the other of the opposed surfaces facing the insulating gap and extending between the inner surface of the outer wall and the outer surface of the inner wall, a second transition wall 7 extending between the other of the opposite edges of the outer wall and the other of the opposite edges of the inner wall, the second transition wall having opposed surfaces with one of the opposed surfaces extending between the outer surface of the outer wall and the inner surface of the inner wall and the other of the opposed surfaces facing the insulating gap and extending between the inner surface of the outer wall and the outer surface of the inner wall, and a weld 10 interconnecting the first transition wall to the second transition wall.

Preferably, this sheet comprises studs 5 which slightly project and are adapted to determine the distance between the two walls of the finished double wall.

Note that the two opposed longitudinal edge portions 6, 7 of the blank shown in FIG. 2 are each constituted by a transition wall portion constituting a fold and therefore do not have solutions of continuity or defect in homogeneity.

Figure 3:
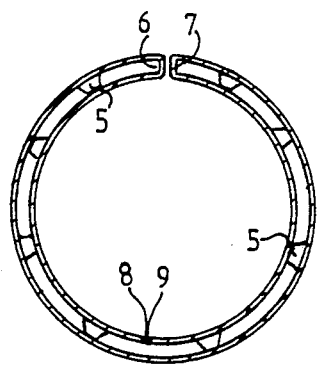
FIG. 3 is a cross-sectional view of a tube before welding.

In FIG. 3, the blank of FIG. 2 has been rolled in such manner as to produce a tube, the two free edges 8, 9 of the initial sheet being disposed in adjacent relation to each other. Further, before rolling, the two folds 6, 7 are subjected to a scraping or truing up so as to impart thereto a more planar shape.

Figure 4:
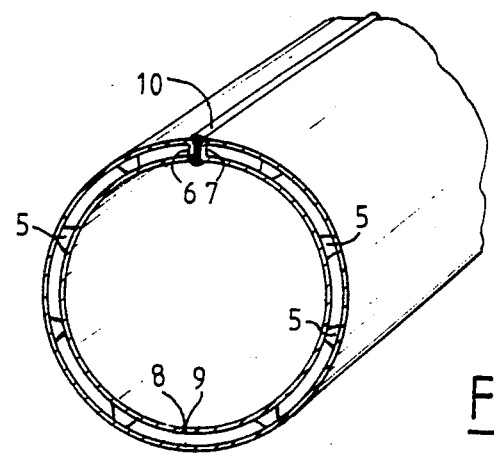
FIG. 4 is a perspective view of a tube after the welding operation.

FIG. 4 shows the weld 10 produced between confronting surfaces of the two folds or transition wall portions 6, 7 for producing the double-wall tube. This weld may be effected by any suitable method, for example with an electrode under an inert gas, by resistance heating or radio-frequency heating.

Note that, in the stage shown in FIG. 2, the two free edges 8, 9 of the two formed-over portions which are rather close to each other can, if desired, be connected to each other, for example by welding. Thus, the inner wall comprises two portions 2, 3, one of the portions 2 extending from one of the opposite edges of the inner wall and the other of the portions extending from the other of the opposite edges of the inner wall, the two portions terminating in adjacent free edges. However, if the free edges of the two portions 2, 3 are interconnected by a weld the inner wall comprises a single portion which forms a continuous wall with the first transition wall, the second transition wall and the outer wall.

In the embodiment shown in FIGS. 5 to 7, the same method is used, except that the sheet 1 does not have studs and in interposed element 11, such as in insulating material is disposed on the central portion 4 of the sheet, this element being for example formed by a netting or any other suitable means, preferably weldable, on which the two lateral portions 2, 3 of the sheet are folded over. Preferably, the netting is placed in position when the wings 2,3 are roughly at 90°, as shown in FIG. 5. Thus, the filler material is interposed in the insulating gap between the outer wall and the inner wall.

The remainder of the method is identical to that described before, for forming first of all a planar blank (FIG. 6) whose two longitudinal edge portions 6, 7 are formed by exterior surfaces of two folds or transition wall portions between the wall portions 2, 3 and 4, this blank being thereafter rolled so as to form a tube, as shown in FIG. 7, which is then finished by a welding operation.

FIGS. 8 and 9 show two slight modifications of this production method in which the blank in which the tube will be formed is not made from a sheet of a single material but of two different materials or two materials having different thicknesses. Thus, at least part of the inner wall and at least part of the outer wall are of different materials.

In the embodiment shown in FIG. 8, three elements or sheets 21, 22, 23 are assembled along two weld lines 24, 25 which are provided on the base of the U at a relatively short distance from the two folds or transition wall portions 26, 27 about which the lateral portions 22, 23 will be formed over. Thus, the transition walls are of the same material as part of the outer walls.

In the embodiment shown in FIG. 9, the two weld lines 34, 35 are provided in the wings 32, 33 of the U and also at a short distance from the folds or transition wall portions 36, 37 about which the two lateral portions will be formed over onto the central portion 31. Thus, the transition wall are of the same material as part of the inner wall.

This arrangement shown in FIGS. 8 and 9 permits the production by the method already described of a tube whose inner and outer walls may have different characteristics, the inner wall being for example made from stainless steel, depending on the nature of the fluid which must be flow in the tube, while the outer wall may be formed by a steel of lower quality.

Figure 10:
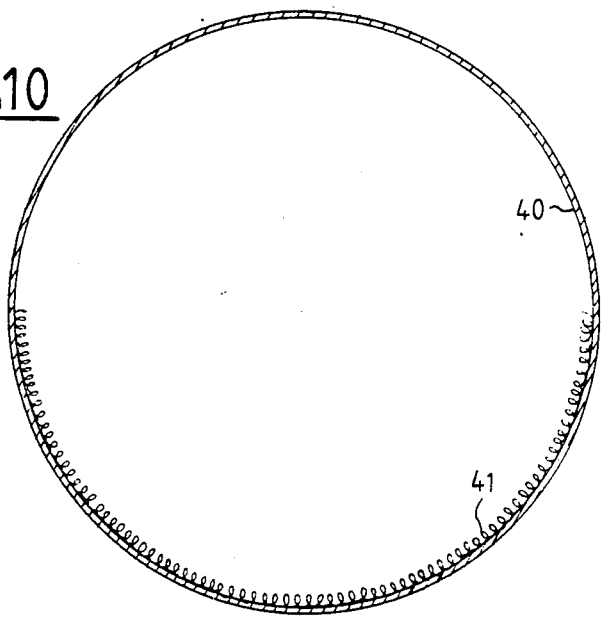
FIGS. 10, 11 and 12 are respectively two sectional views and one perspective view of another modification.
Figure 11:
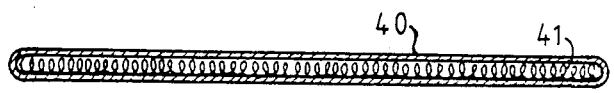
Figure 12:
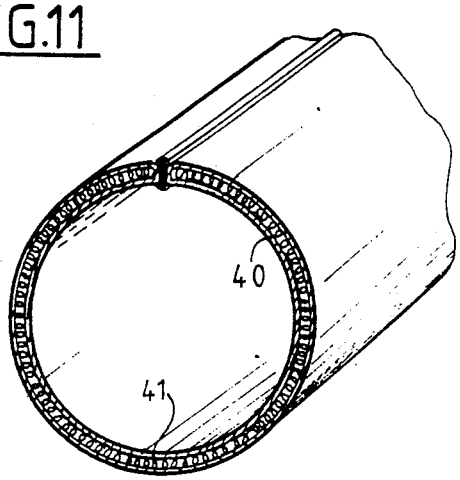

In the embodiment shown in FIGS. 10 to 12, there is taken a metal tube 40 of round shape or a shape already partly flattened and, in order to constitute a planar blank, it is sufficient to flatten or to finish the flattening of this tube (FIG. 11) and then roll and weld it as shown in FIG. 12. Preferably, there is disposed inside the initial tube 40, a filler material 41 whose width is chosen to be roughly equal to or slightly less than one half of the length of the circumference of the tube (FIG. 10) so as to produce a composite tube similar to that shown in FIG. 7.

In these various modifications, the metal according to the invention produces a tube whose weld region is of excellent quality. Indeed, in all cases, the weld is effected in a region where the material constituting the inner and outer walls of the tube forms a fold or transition wall portion and therefore does not have a solution of continuity or a defect of homogeneity.

The sealing properties and the performance of the tube are thereby very substantially improved.

It must be understood that the method of the invention may also be applied to the production of tubes having multiple walls exceeding two walls and with a great variety of interposed or filler materials between these walls. Likewise, the composition of the material forming the tube itself may be subjected very many modifications.

What is claimed is:

1. A double-wall welded tube comprising an outer wall protion, at least one inner wall portion within said outer wall portion, spaced and insulated from said outer wall portion inwardly of the tube by an insulating gap, two non-welded transition wall portions extending inwardly of the tube from said outer wall portion and connecting said outer wall portion to said at least one inner wall portion, said outer wall portion, said at least one inner wall portion and said transition wall portions constituting a continuous closed on itself wall made from a single sheet defining the double wall of the tube, said transition wall portions constituting folds without a defect in homogeneity in said closed on itself wall and having directly confronting surfaces in adjacent relation to each other, and a weld interconnecting said confronting surfaces of said transition wall portions.

2. A tube according to claim 1, wherein said at least one inner wall portion and said outer wall portion are made from different materials, except in the immediate vicinity of said transition wall portions.

3. A tube according to claim 1, further comprising a insulating material in the gap between said at least one inner wall portion and said outer wall portion.

4. A tube according to claim 1, wherein there are two of said inner wall portions respectively connected to said transition wall portions and terminating in edges which are remote from said transition wall portions and are in adjacent relation to each other.

5. A tube according to claim 4, wherein a weld interconnects said two edges.

6. A tube according to claim 1, wherein there is only one inner wall portion and said closed on itself wall has no defect in homogeneity.

7. A double-wall tube, comprising:
an outer wall having an outer surface and an inner surface extending between opposite edges thereof;
an inner wall having an outer surface and an inner surface extending between opposite edges thereof, said inner wall comprising at least one portion and said outer surface of said inner wall spaced from said inner surface of said outer wall with an insulating gap therebetween;
a first transition wall extending between one of said opposite edges of said outer wall and one of said opposite edges of said inner wall, said inner wall, said first transition wall, and said outer wall being continuous and made from a single sheet
a second transition wall extending between the other of said opposite edges of said outer wall and the other of said opposite edges of said inner wall, said inner wall, said second transition wall, and said outer wall being continuous and made from a single sheet and
a weld interconnecting said first transition wall to said second transition wall.

8. the double-wall tube of claim 7, wherein at least a portion of said inner wall and at least a portion of said outer wall are of different materials.

9. The double-wall tube of claim 8, wherein said transition walls are of the same material as said portion of said inner wall.

10. The double-wall tube of claim 8, wherein said transition walls are of the same material as said portion of said outer wall.

11. The double-wall tube of claim 7, further comprising a material interposed in said insulating gap between said outer wall and said inner wall.

12. The double-wall tube of claim 11, wherein said material is an insulating material.

13. The double-wall tube of claim 11, wherein said material is a wire netting.

14. The double-wall tube of claim 7, wherein a plurality of studs extend between said outer wall and said inner wall.

15. The double-wall tube of claim 7, wherein said inner wall comprises two portions, one of said portions extending from one of said opposite edges of said inner wall and the other of said portions extending from the other of said opposite edges of said inner wall, said two portions terminating in adjacent free edges.

16. The double-wall tube of claim 15, wherein a weld interconnects said adjacent free edges of said two portions.

17. The double-wall tube of claim 7, wherein said inner wall comprises a single portion which forms a continuous wall with said first transition wall, said second transition wall and said outer wall.

* * * * *